(12) United States Patent
Timonen et al.

(10) Patent No.: US 11,503,270 B1
(45) Date of Patent: Nov. 15, 2022

(54) IMAGING SYSTEMS AND METHODS FOR FACILITATING LOCAL LIGHTING

(71) Applicant: Varjo Technologies Oy, Helsinki (FI)

(72) Inventors: Petteri Timonen, Helsinki (FI); Ville Timonen, Helsinki (FI); Joni-Matti Määttä, Tampere (FI); Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/398,131

(22) Filed: Aug. 10, 2021

(51) Int. Cl.
*H04N 13/254* (2018.01)
*H05B 47/10* (2020.01)
*H04N 13/275* (2018.01)

(52) U.S. Cl.
CPC ......... *H04N 13/254* (2018.05); *H04N 13/275* (2018.05); *H05B 47/10* (2020.01)

(58) Field of Classification Search
USPC .......................................................... 348/46
See application file for complete search history.

(56) References Cited

U.S. PATENT DOCUMENTS

| | | | | |
|---|---|---|---|---|
| 9,563,955 | B1 * | 2/2017 | Kamarshi | G06T 7/246 |
| 10,586,383 | B2 * | 3/2020 | Wang | G06T 17/00 |
| 2006/0221072 | A1 * | 10/2006 | Se | G06T 17/00 |
| | | | | 345/420 |
| 2019/0304113 | A1 * | 10/2019 | Huang | G06T 1/20 |
| 2022/0189108 | A1 * | 6/2022 | Shandilya | G06T 7/90 |

FOREIGN PATENT DOCUMENTS

| | | | | |
|---|---|---|---|---|
| WO | WO-2018175217 | A1 * | 9/2018 | G06T 17/00 |
| WO | WO-2018200337 | A1 * | 11/2018 | G06T 19/00 |
| WO | WO-2022005523 | A1 * | 1/2022 | G06K 9/00979 |
| WO | WO-2022155454 | A1 * | 7/2022 | A61B 34/10 |

* cited by examiner

*Primary Examiner* — Behrooz M Senfi
(74) *Attorney, Agent, or Firm* — Ziegler IP Law Group, LLC (57) ABSTRACT

An imaging system including visible-light camera(s), depth sensor(s), pose-tracking means, and server(s) configured to: control visible-light camera(s) and depth sensor(s) to capture visible-light images and depth images of real-world environment, respectively, whilst processing pose-tracking data to determine poses of visible-light camera(s) and depth sensor(s); reconstruct three-dimensional lighting model of real-world environment representative of lighting in different regions of real-world environment; receive, from client application, request message comprising information indicative of location in real-world environment where virtual object(s) is to be placed; utilise three-dimensional lighting model to create sample lighting data for said location, wherein sample lighting data is representative of lighting at given location in real-world environment; and provide client application with sample lighting data.

20 Claims, 3 Drawing Sheets

IMAGING SYSTEMS AND METHODS FOR FACILITATING LOCAL LIGHTING

TECHNICAL FIELD

The present disclosure relates to imaging systems for facilitating local lighting. The present disclosure also relates to methods for facilitating local lighting.

BACKGROUND

In recent times, immersive extended-reality (XR) technologies such as virtual-reality (VR), augmented-reality (AR), mixed-reality (MR) are being extensively employed in various fields such as entertainment, real estate, training, medical imaging operations, simulators, navigation, and the like. Such immersive XR technologies create immersive XR environments (constituted by XR images) for presentation to a user of an XR device (such as an XR headset, a pair of XR glasses, or similar). The user is present in a real-world environment which may, for example, be an indoor environment or an outdoor environment. The real-world environment typically includes real object(s) present therein. In some XR environments, it is desirable to show at least some of the real object(s) along with virtual content (such as virtual objects). The virtual content is computer-generated content.

Typically, lighting within the real-world environment is of significance when generating the XR images for presentation to the user within an XR environment. Typically, lighting information of the real-world environment is employed by the XR device for lighting (namely, illuminating) the virtual content in said XR images. This lighting information facilitates in achieving photorealism within the XR environment.

Existing techniques and equipment utilized for lighting the virtual content have several limitations. Firstly, the existing techniques produce the lighting information considering all the real object(s) present in the real-world environment to be at infinity. In such a case, the lighting information is inaccurately produced (namely, in a distorted manner) since reflections of the real object(s) may appear at wrong positions and with wrong sizes and/or orientations, and relative distance(s) between two or more real object(s) is/are unknown. As a result, the lighting of the virtual content is performed in a suboptimal (i.e., inaccurate and unrealistic) manner which adversely impacts photorealism in the XR environment. In an example, reflections of real object(s) near the virtual content may be present at wrong positions with inaccurate sizes of reflections, in the XR images. In another example, a moving real object may be inaccurately reflected off the virtual content (such as a virtual car) at multiple positions, in the XR images.

Secondly, some existing techniques produce the lighting information from a fixed (namely, static) location in the real-world environment. Such techniques often require a person to perform scanning of the real-world environment (such as, via cameras) from the fixed position to capture the lighting information from a perspective of the fixed location. In such a case, the lighting information is unreliable and error-prone because the real-world environment may have different lighting when viewed from different locations and from different directions. As a result, the lighting of the virtual content is performed inaccurately and unrealistically. When the person moves around the real-world environment to perform said scanning, unrealistic reflections are captured in the lighting information. Moreover, such existing techniques are suboptimal as they require manual intervention for carrying and manually controlling (for example, by activating and/or deactivating controls) equipment for scanning the real-world environment.

Thirdly, the lighting information of the real-world environment is often modelled inaccurately and inconsistently. In such a case, when said lighting information is employed for lighting the virtual content that is to be placed far away from the user, said virtual content would be inaccurately illuminated in the XR images. As an example, the virtual content may be illuminated by light source(s) which is/are not supposed to illuminate the virtual content. As another example, the virtual content may be inaccurately illuminated from various directions, at inaccurate positions, and with an inaccurate intensity of lighting. Moreover, farther the virtual content from the user, greater is the inaccuracy of lighting the virtual content.

Therefore, in light of the foregoing discussion, there exists a need to overcome the aforementioned drawbacks associated with existing equipment and techniques for lighting virtual objects in XR environments.

SUMMARY

The present disclosure seeks to provide an imaging system for facilitating local lighting. The present disclosure also seeks to provide a method for facilitating local lighting. An aim of the present disclosure is to provide a solution that overcomes at least partially the problems encountered in prior art.

In one aspect, an embodiment of the present disclosure provides an imaging system comprising:
  at least one visible-light camera;
  at least one depth sensor;
  pose-tracking means; and
  at least one server configured to:
    control the at least one visible-light camera and the at least one depth sensor to capture a plurality of visible-light images and a plurality of depth images of a real-world environment, respectively, whilst processing pose-tracking data obtained from the pose-tracking means to determine corresponding poses of the at least one visible-light camera and the at least one depth sensor with respect to which the plurality of visible-light images and the plurality of depth images are captured, respectively;
    reconstruct a three-dimensional lighting model of the real-world environment, based on the plurality of visible-light images, the plurality of depth images and the corresponding poses of the at least one visible-light camera and the at least one depth sensor, wherein the three-dimensional lighting model is representative of lighting in different regions of the real-world environment and stores data pertaining to the lighting in the different regions;
    receive, from a client application, a request message comprising information indicative of a given location in the real-world environment where at least one virtual object is to be placed;
    utilise the three-dimensional lighting model of the real-world environment to create sample lighting data for the given location in the real-world environment, wherein the sample lighting data is representative of the lighting at the given location in the real-world environment; and
    provide the client application with the sample lighting data.

In another aspect, an embodiment of the present disclosure provides a method comprising:

controlling at least one visible-light camera and at least one depth sensor to capture a plurality of visible-light images and a plurality of depth images of a real-world environment, respectively, whilst processing pose-tracking data obtained from pose-tracking means to determine corresponding poses of the at least one visible-light camera and the at least one depth sensor with respect to which the plurality of visible-light images and the plurality of depth images are captured, respectively;

reconstructing a three-dimensional lighting model of the real-world environment, based on the plurality of visible-light images, the plurality of depth images and the corresponding poses of the at least one visible-light camera and the at least one depth sensor, wherein the three-dimensional lighting model is representative of lighting in different regions of the real-world environment and stores data pertaining to the lighting in the different regions;

receiving, from a client application, a request message comprising information indicative of a given location in the real-world environment where at least one virtual object is to be placed;

utilising the three-dimensional lighting model of the real-world environment to create sample lighting data for the given location in the real-world environment, wherein the sample lighting data is representative of the lighting at the given location in the real-world environment; and providing the client application with the sample lighting data.

Embodiments of the present disclosure substantially eliminate or at least partially address the aforementioned problems in the prior art, and enable accurate and photorealistic lighting of virtual object(s) (in an XR environment) by way of providing the sample lighting data that is created using an accurate and a comprehensive three-dimensional lighting model, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:

at least one visible-light camera;
at least one depth sensor;
pose-tracking means; and
at least one server configured to:

control the at least one visible-light camera and the at least one depth sensor to capture a plurality of visible-light images and a plurality of depth images of a real-world environment, respectively, whilst processing pose-tracking data obtained from the pose-tracking means to determine corresponding poses of the at least one visible-light camera and the at least one depth sensor with respect to which the plurality of visible-light images and the plurality of depth images are captured, respectively;

reconstruct a three-dimensional lighting model of the real-world environment, based on the plurality of visible-light images, the plurality of depth images and the corresponding poses of the at least one visible-light camera and the at least one depth sensor, wherein the three-dimensional lighting model is representative of lighting in different regions of the real-world environment and stores data pertaining to the lighting in the different regions;

receive, from a client application, a request message comprising information indicative of a given location in the real-world environment where at least one virtual object is to be placed;

utilise the three-dimensional lighting model of the real-world environment to create sample lighting data for the given location in the real-world environment, wherein the sample lighting data is representative of the lighting at the given location in the real-world environment; and provide the client application with the sample lighting data.

In another aspect, an embodiment of the present disclosure provides a method comprising:

controlling at least one visible-light camera and at least one depth sensor to capture a plurality of visible-light images and a plurality of depth images of a real-world environment, respectively, whilst processing pose-tracking data obtained from pose-tracking means to determine corresponding poses of the at least one visible-light camera and the at least one depth sensor with respect to which the plurality of visible-light images and the plurality of depth images are captured, respectively;

reconstructing a three-dimensional lighting model of the real-world environment, based on the plurality of visible-light images, the plurality of depth images and the corresponding poses of the at least one visible-light camera and the at least one depth sensor, wherein the three-dimensional lighting model is representative of lighting in different regions of the real-world environment and stores data pertaining to the lighting in the different regions;

receiving, from a client application, a request message comprising information indicative of a given location in the real-world environment where at least one virtual object is to be placed;

utilising the three-dimensional lighting model of the real-world environment to create sample lighting data for the given location in the real-world environment, wherein the sample lighting data is representative of the lighting at the given location in the real-world environment; and providing the client application with the sample lighting data.

The present disclosure provides the aforementioned imaging system and the aforementioned method for facilitating local lighting. Herein, the imaging system reconstructs an accurate and a comprehensive three-dimensional (3D) lighting model of the real-world environment, based on visual content and optical depth information of the real-world environment that is captured from various poses of the at least one visible-light camera and the at least one depth sensor. Beneficially, said 3D lighting model comprises accurate and comprehensive data pertaining to the lighting (i.e., lighting information) in the different regions of the real-world environment. Moreover, the sample lighting data (representing a portion of the entire data pertaining to the lighting) is created (based on the request message of the client application) in real time or near-real time (without any latency) using the 3D lighting model. This sample lighting data facilitates photorealistic local lighting of the at least one virtual object at the given location. Creation of the sample lighting data requires minimal computational resources of the at least one server, and also requires minimal bandwidth for communication to the client application. When generating a given XR image, the client application employs the sample lighting data to accurately and photorealistically light the at least one virtual object at the given location in the XR environment. Resultantly, the given XR image is optimally generated (i.e., realistically and accurately) in real-time (without any latency). Therefore, when the user of the display apparatus views the given XR image, the user experiences realism and immersiveness within the XR environment. Furthermore, the sample lighting data can be employed to accurately reflect light off surface(s) of virtual object(s) which may not even currently be in field(s) of view of the at least one visible-light camera and/or the at least one depth sensor. This reflected light would be accurately visible in the given XR image, thereby enhancing realism in the given XR image.

The imaging system comprises specialized equipment for capturing the plurality of visible-light images and the plurality of depth images of the real-world environment, and then reconstructing the three-dimensional (3D) lighting model of the real-world environment, which is then used to create the sample lighting data for the client application. It will be appreciated that the imaging system creates the sample lighting data for the client application in real time or near-real time.

Optionally, the client application executes on a display apparatus. Optionally, the imaging system is communicably coupled with the display apparatus wirelessly and/or in a wired manner. The term "display apparatus" refers to a specialized equipment that is capable of executing the client application and displaying XR images. These XR images optionally constitute a visual scene of an XR environment, and are generated by the client application. The XR images are to be presented to a user of the display apparatus. Optionally, the display apparatus is implemented as a head-mounted display (HMD). The term "head-mounted display" refers to specialized equipment that is configured to present the XR environment to the user when said HMD, in operation, is worn by the user on his/her head. The HMD is implemented, for example, as an XR headset, a pair of XR glasses, and the like, that is operable to display the visual scene of the XR environment to the user. The term "extended-reality" encompasses virtual reality (VR), augmented reality (AR), mixed reality (MR), and the like.

In some implementations, the imaging system is optionally integrated with the display apparatus. In such implementations, the imaging system is physically coupled to the display apparatus (for example, attached via mechanical and/or electrical connections to components of the display apparatus). For example, the at least one visible-light camera and the at least one depth sensor may be arranged on an outer surface of the display apparatus that faces the real-world environment. Optionally, in such implementations, the at least one server of the imaging system serves as a processor of the display apparatus. Alternatively, optionally, in such implementations, the at least one server is communicably coupled to a processor of the display apparatus wirelessly and/or in a wired manner.

In other implementations, the imaging system is optionally implemented on a remote device that is separate from the display apparatus. In such implementations, the at least one server and a processor of the display apparatus are communicably coupled wirelessly and/or in a wired manner. Optionally, the imaging system is mounted on the remote device. Examples of the remote device include, but are not limited to, a drone, a vehicle, and a robot. Optionally, the remote device is physically positioned in the real-world environment, whereas the user of the display apparatus is positioned away from (for example, at a distance from) the remote device.

In yet other implementations, the imaging system is optionally arranged at a given location within the real-world environment. For example, the imaging system may be arranged on a support structure and may be capable of 3D rotation (and additionally, capable of translation motion). Herein, the support structure can be moved to any required location in the real-world environment.

Throughout the present disclosure, the term "client application" refers to a software application that generates a given XR image. Notably, the client application is a program or process executing on the display apparatus, for generating the given XR image. The given XR image may pertain to an XR game, an XR tutorial, an XR instructional simulator, an XR movie, an XR educational video, and the like. It will be appreciated that the given XR image is generated by using an image of the real-world environment and virtually superimposing the at least one virtual object thereon.

Notably, the at least one server controls overall operation of the imaging system. In particular, the at least one server is communicably coupled to and controls operation of the at least one visible-light camera, the at least one depth sensor, and the pose-tracking means. It will be appreciated that the at least one server is communicably coupled with the client application. Optionally, the at least one server and the client application are communicably coupled via an Application Programming Interface (API).

In an embodiment, the at least one server is implemented as a processor of a computing device. In such a case, the at least one server is communicably coupled to other components of the imaging system via the computing device. Examples of the computing device include, but are not limited to, a laptop computer, a desktop computer, a tablet computer, a phablet, a personal digital assistant, a workstation, a console. In another embodiment, the at least one server is implemented as a remote server.

Throughout the present disclosure, the term "visible-light camera" refers to an equipment that is operable to detect and process signals, such as visible-light signals, received from the real-world environment, so as to capture the plurality of visible-light images of the real-world environment. A given visible-light image represents a visual content of the real-world environment. Examples of the at least one visible-light camera include, but are not limited to, a Red-Green-Blue (RGB) camera, a Red-Green-Blue-Alpha (RGB-A) camera, and a monochrome camera. In a first example, the at least one visible-light camera may be the RGB camera, and the given visible-light image may comprise RGB texture data.

Throughout the present disclosure, the term "depth sensor" refers to a sensor that is operable to at least detect optical depths in the real-world environment so as to capture the plurality of depth images of the real-world environment. A given depth image represents optical depth(s) of real object(s) present in the real-world environment. The given depth image may also represent the visual content of the real-world environment, in addition to the optical depth(s) of the real object(s). Optionally, the given depth image is a two-dimensional (2D) depth image or a 3D depth image. The at least one depth sensor may be implemented as a light-based depth sensor, a sound-based depth sensor, or similar.

Optionally, the at least one depth sensor is a part of at least one depth camera. The at least one depth camera could be arranged on the display apparatus worn by the user on his/her head, or could be arranged anywhere in the real-world environment where the user is present, or could be arranged on the remote device present in the real-world environment. Examples of at least one depth camera include, but are not limited to, a Red-Green-Blue-Depth (RGB-D) camera, a stereo camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a plenoptic camera, an infrared camera. In a second example, the at least one depth camera may be the stereo camera, and the given depth image may comprise RGB-D texture data.

Optionally, the imaging system comprises only the at least one visible-light camera, the pose-tracking means, and the at least one server, wherein the at least one server is configured to process the plurality of visible-light images using a Structure from Motion (SfM) technique to determine depth information of the of the real-world environment. This depth information comprises the optical depths in the real-world environment.

Throughout the present disclosure, the term "pose-tracking means" refers to specialized equipment that is employed to detect and/or follow poses of the at least one visible-light camera and the at least one depth sensor. The term "pose" encompasses both position and orientation. Optionally, the at least one visible-light camera and the at least one depth sensor are mounted on the display apparatus, and the pose-tracking means is employed to track the poses of the at least one visible-light camera and the at least one depth sensor, wherein said poses correspond to a pose of the display apparatus. Thus, in such a case, the poses of the at least one visible-light camera and the at least one depth sensor change according to a change in the pose of the display apparatus. Pursuant to embodiments of the present disclosure, the pose-tracking means is implemented as a true six Degrees of Freedom (6DoF) tracking system. In other words, the pose-tracking means tracks both positions and orientations of the at least one visible-light camera and the at least one depth sensor within a 3D space of the real-world environment. In particular, said pose-tracking means is configured to track translational movements (namely, surge, heave and sway movements) and rotational movements (namely, roll, pitch and yaw movements) of the at least one visible-light camera and the at least one depth sensor within the 3D space.

The pose-tracking means could be implemented as an internal component of the imaging system, as a tracking system external to the imaging system, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. Optionally, the pose-tracking means is implemented as a processor that is configured to determine the poses of the at least one visible-light camera and the at least one depth sensor using a simultaneous localization and mapping (SLAM) technique.

Optionally, the at least one server employs at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to track the poses of the at least one visible-light camera and the at least one depth sensor. Examples of the at least one data processing algorithm include a feature detection algorithm, an environment mapping algorithm, a pose data extrapolation algorithm, and the like. Moreover, the pose-tracking means employs either an outside-in tracking technique or an inside-out tracking technique for obtaining the pose-tracking data.

As an example, said means may be implemented as Valve Corporation's SteamVR® tracking (that employs the outside-in tracking technique), where active lighthouses (that are detectable objects) sending infrared signals are installed at fixed locations in the real-world environment in which the imaging system is being used. In such a case, the imaging system comprises detectors that detect these infrared signals and determine the poses of the at least one visible-light camera and the at least one depth sensor relative to the fixed locations of the lighthouses. As another example, said means may be implemented as a magnetic tracking system from Polhemus, where an active magnetic field is generated using a transmitter in the real-world environment, and at least one receiver that is capable of sensing the magnetic field is installed into the imaging system. As yet another example, said means may be implemented as an optical outside-in tracking technique (for example, such as OptiTrack™ and ART tracking), where the display apparatus is fitted with IR retroreflective markers or IR LEDs, and at least one IR camera is installed in the real-world environment to capture IR light reflected from the markers or emitted by the IR LEDs.

It will be appreciated that the given visible-light image and the given depth image of the real-world environment are captured from certain poses of the at least one visible-light camera and the at least one depth sensor, respectively. In other words, the at least one visible-light camera and the at least one depth sensor are arranged to capture the given visible-light image and the given depth image of the real-world environment from perspectives of corresponding poses of the at least one visible-light camera and the at least one depth sensor, respectively. The pose-tracking data corresponding to a time of capturing the given visible-light image and the pose-tracking data corresponding to a time of capturing the given depth image are processed to determine the poses of the at least one visible-light camera and the at least one depth camera with respect to which the given visible-light image and the given depth image are captured, respectively. The given visible-light image and the given depth image are subsequently used to reconstruct the 3D lighting model of the real-world environment, from the aforesaid perspectives. Notably, the step of capturing the plurality of visible-light images and the plurality of depth images, and the step of determining the poses of the at least one visible-light camera and the at least one depth sensor poses are repeated, as the user moves around the real-world environment.

Throughout the present disclosure, the term "three-dimensional lighting model" refers to a 3D model of the lighting in the different regions of the real-world environment. In other words, the 3D lighting model represents different lighting conditions in the different regions of the real-world environment. As an example, some regions may have dark lighting conditions (for example, shadows), while other regions may have bright lighting conditions. Optionally, the different regions of the real-world environment have the different lighting conditions due to an arrangement of at least one light source present in the real-world environment. Optionally, the at least one light source is a natural light source and/or an artificial light source. The natural light source can be the Sun, whereas the artificial light source can be a lamp, a tube light, a light-emitting element (such as a light-emitting diode, a seven-segment display, or similar), a display, a projector, a candle, and the like.

Optionally, when reconstructing the 3D lighting model, the at least one server is configured to employ a fusion technique utilizing the plurality of visible-light images, the plurality of depth images, and the 3D lighting model. The fusion technique depends on a given form of the 3D lighting model. As an example, the fusion technique may be a volumetric fusion technique, wherein the form of 3D lighting model is a 3D grid, and the plurality of visible-light images and the plurality of depth images are fused into the 3D grid. As another example, the fusion technique may be a point cloud fusion technique, wherein the form of 3D lighting model is a 3D point cloud, and the plurality of visible-light images and the plurality of depth images are fused into the 3D point cloud. Referring to the first and second examples, when reconstructing the 3D lighting model, the fusion technique may utilize the RGB texture data, the RGB-D texture data, the 3D lighting model, and poses of the RGB camera and the stereo camera.

It will be appreciated that when the 3D lighting model is reconstructed based on the plurality of visible-light images, the plurality of depth images, and the corresponding poses of the at least one visible-light camera and the at least one depth sensor, the 3D lighting model is accurately and comprehensively reconstructed. This is because information pertaining to the visual content as well as the optical depth in the real-world environment is accurately known in great detail from all perspectives of the at least one visible-light camera and the at least one depth sensor. Beneficially, the 3D lighting model comprises extensive and comprehensive data pertaining to the lighting in the different regions. Optionally, the 3D lighting model is stored at a data repository that is communicably coupled to the at least one server.

Optionally, the three-dimensional lighting model is in a form of at least one of: a three-dimensional grid, a three-dimensional hierarchical grid, a bounding volume hierarchy, a three-dimensional polygonal mesh. Herein, the form of the 3D lighting model is a 3D data format (such as a 3D data structure) that is used to represent the 3D lighting model. It will be appreciated that when the 3D lighting model is in the form of at least one of the aforementioned forms, representation of the 3D lighting model would be highly accurate, space efficient, and easy to process.

The term "three-dimensional grid" refers to a 3D data structure having a 3D grid pattern. Optionally, the 3D grid is produced by dividing a 3D space into the 3D grid pattern, wherein the 3D grid pattern comprises a plurality of 3D blocks. Each 3D block corresponds to a corresponding region of the real-world environment. As an example, a length, a breadth, and a height of a given 3D block amongst the plurality of 3D blocks may be 0.5 metres each. The term "three-dimensional hierarchical grid" refers to a 3D data structure having a hierarchical 3D grid pattern (namely, a multilevel 3D grid pattern). In other words, the 3D hierarchical grid has different 3D grid patterns that are arranged at different hierarchical levels. Optionally, the 3D hierarchical grid is produced by dividing a 3D space of the real-world environment into the different 3D grid patterns, based on the different hierarchical levels. Each 3D grid pattern amongst the different 3D grid patterns comprises at least one 3D block. The different hierarchical levels correspond to different levels of abstraction with which the data pertaining to the lighting in the different regions of the real-world environment is stored. The hierarchical levels can be understood to begin at a root level, and to increase on going away from the root level towards a lowermost (i.e., deepest) level of the 3D hierarchical grid. It will be appreciated that greater (i.e., lower) a hierarchical level, smaller is a size of a 3D block and finer is a 3D grid pattern, and vice versa. As an example, for a first hierarchical level (i.e., the root level), a length, a breadth, and a height of a given 3D block may be 2 metres each. For a second hierarchical level (i.e., an intermediate level below the root level), a length, a breadth, and a height of a given 3D block may be 0.5 metres each. For a third hierarchical level (i.e., the lowermost level below the intermediate level), a length, a breadth, and a height of a given 3D block may be 0.05 metres each. The term "bounding volume hierarchy" refers to a tree structure comprising multiple hierarchically-arranged bounding volumes (namely, bounding boxes) that include or surround lighting and visual content represented in the plurality of visible-light images and the plurality of depth images. It will be appreciated that a 3D space of the real-world environment is divided into bounding volumes, based on a variance in the data pertaining to the lighting in the different regions of the real-world environment. The term "three-dimensional polygonal mesh" refers to a 3D mesh that uses vertices, edges, and faces of a polygon (such as a triangle, a quadrilateral, and the like) to define the different regions in the real-world environment and to represent the lighting in the different regions. The 3D polygonal mesh could be a 3D triangular mesh, a 3D quadrilateral mesh, or similar. In some implementations, any of the 3D grid, the 3D hierarchical grid, the bounding volume hierarchy could be assigned to the vertices of the 3D polygonal mesh. In other implementations, the 3D polygonal mesh may be textured in a manner that an output irradiance for a given location within the polygon can be obtained using a bitmap corresponding to the polygon. It will be appreciated that the 3D lighting model could also have other form(s) besides the ones listed hereinabove. For example, the 3D lighting model could also be in the form of a 3D point cloud, a voxel-based model, a parametric model, or similar.

Optionally, the different regions of the real-world environment are at different hierarchical levels (in the 3D lighting model). Moreover, optionally, a given region of the real-world environment has different hierarchical levels. In this regard, different subregions of the given region are at the different hierarchical level. Therefore, a quality (namely, detail) of the data pertaining to the lighting is different for the different subregions at the different hierarchical levels. Greater a hierarchical level, greater is the quality of the data pertaining to the lighting, and more detailed is the data pertaining to the lighting for a given subregion.

Optionally, the data pertaining to the lighting in the different regions comprises at least one of: 360-degree environment cube maps, coefficients of a spherical harmonics representation, pixel values, bitmaps, panorama formats. The data pertaining to the lighting in the different regions constitutes lighting information of the real-world environment, and can be represented in the one or more manners mentioned hereinabove. The term "360-degree environment cube map" refers to a collection of six square textures representing views of the real-world environment onto six faces of a cube being used as a map. These views depict lighting in a given region of the real-world environment. Optionally, a given 360-degree environment cube map is generated by rendering the view of the real-world environment six times with respect to given poses of the at least one visible-light camera and the at least one depth sensor, wherein said views are defined by a 90 degree view frustum representing each face of the cube. Each face of the cube represents a view of the of the real-world environment along a given direction (from amongst six directions namely, an upward direction, a downward direction, a left direction, a right direction, a forward direction, and a backward direction) of a world axis. The term "spherical harmonics representation" refers to a representation of special functions that are defined over a spherical or hemispherical domain. Such functions are designed in a manner that the coefficients of the functions are indicative of the data pertaining to the lighting in the different regions. Optionally, an order of spherical harmonics representation lies in a range of 1 to 7. As an example, the order of spherical harmonics representation may be from 1, 2, 3, 4 or 5 up to 3, 5 or 7. The term "pixel value" refers to an illumination value of a given pixel of a given region of the real-world environment which encompasses not only a colour value (namely, intensity) of the given pixel, but also a luminance value (for example, such as a hue value, a saturation value, and a lightness value), a transparency value, or similar, of the given pixel. Optionally, the colour value is an RGB colour value. Alternatively, optionally, the colour value is a high dynamic range (HDR) colour value. Yet alternatively, optionally, the colour value is an RGB-A colour value. The term "bitmap" refers to an array of pixels (namely, dots) representing visual information of a given region of the real-world environment. The bitmap includes the illumination value of each pixel, by way of one bit per pixel. The term "panorama format" refers to a format that is used to map the (3D) views of the real-world environment onto a 2D texture. These views depict lighting in a given region of the real-world environment. Examples of the panorama format include, but are not limited to, an equirectangular panorama format, a cylindrical panorama format, a rectilinear panorama format.

It will be appreciated that the data pertaining to the lighting is either present at every hierarchical level associated with the 3D lighting model, or is only present at a lowest hierarchical level associated with the 3D lighting model. Moreover, each of the aforementioned representations of the data pertaining to the lighting is easy to process, highly accurate, and precise.

Upon reconstructing the 3D lighting model of the real-world environment, the at least one server receives the request message from the client application. Notably, the request message serves as an input according to which the sample lighting data is created. In particular, the at least one server creates the sample lighting data according to the given location in the real-world environment where the at least one virtual object is to be placed (namely, embedded). This facilitates requisite lighting of the at least one virtual object by the client application. Optionally, the real-world environment is associated with a coordinate system having a predefined origin and three coordinate axes, for example, such as X, Y, and Z axes. Optionally, the given location in the real-world environment is expressed as (x, y, z) position coordinates along the X, Y and Z axes, respectively.

Throughout the present disclosure, the term "virtual object" refers to a computer-generated object (namely, a digital object). Examples of the virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), a virtual vehicle or part thereof (such as a virtual car, a virtual cockpit, and so forth), and a virtual information (such as a virtual news description, a virtual announcement, virtual data, and so forth).

Throughout the present disclosure, the term "sample lighting data" refers to a portion of the data pertaining to the lighting in the different regions that is sampled from the 3D lighting model. Notably, when utilising the 3D lighting model of the real-world environment to create the sample lighting data, the at least one server maps the given location of the real-world environment to a corresponding location in the 3D lighting model of the real-world environment, wherein a portion of the data pertaining to the lighting in the corresponding location is the sample lighting data. It will be appreciated that since the sample lighting data is only a portion (namely, a subset) of the data pertaining to the lighting, the sample lighting data is created in real time or near-real time (without any latency). Moreover, creation of the sample lighting data requires minimal computational resources of the at least one server, and also requires minimal bandwidth for communication to the client application. Further, the technical benefit of creating the sample lighting data is that when the sample lighting data is employed by the client application, the at least one virtual object would be accurately illuminated even when the at least one virtual object is far away from the user, the at least one visible-light camera, or the at least one depth sensor.

Optionally, the three-dimensional lighting model is in a form of a three-dimensional grid, and wherein the sample lighting data comprises given data stored in N nearest leaf nodes in the three-dimensional grid that are weighted based on their distances from the given location in the real-world environment. In this regard, the given data stored in the N nearest leaf nodes in the 3D grid comprises lighting data for the given location and region(s) surrounding the given location. Moreover, when a given leaf node is near to the given location (i.e., when distance between the given leaf node and the given location is minimal), a portion of the given data stored in the given leaf node would have a higher weightage as compared to portion(s) of the given data stored in other leaf node(s) which is/are far from the given location. This is because the portion of the given data stored in the (nearby) given leaf node is more relevant for accurately lighting the at least one virtual object which is to be placed at the given location, as compared to portion(s) of the given data stored in the other (farther) leaf node(s). A weightage of the given data decreases with increase in distances between the N nearest leaf nodes and the given location in the real-world environment.

Optionally, a weight of a given nearest leaf node amongst the N nearest leaf nodes lies in a range of 0 to 1. Here, 0 indicates lowest weight (when a distance between the given nearest leaf node and the given location is highest), while 1 indicates highest weight (when a distance between the given nearest leaf node and the given location is least). As an example, the weight of the given nearest leaf node may be from 0, 0.1, 0.2, 0.4, 0.6 or 0.8 up to 0.3, 0.5 or 1. In an example, distances between four nearest leaf nodes X1, X2, X3, and X4 and a given location may be A1, A2, A3, and A4, respectively. Herein, the distance A1 is greater than the distance A4 which is greater than the distance A2, which is greater than the distance A3. Thus, weights of the four nearest leaf nodes X1, X2, X3, and X4 may be 0.8, 0.5, 0.1, and 0.75, respectively. It will be appreciated that other ways and/or ranges of expressing the weight of the given nearest leaf node are also feasible. For example, the weight of the given nearest leaf node amongst the N nearest leaf nodes may lie in a range of 0 to 100, wherein 0 indicates lowest weight, while 100 indicates highest weight.

Optionally, a value of N lies in a range of 1 to 512. As an example, the value of N may be from 1, 10, 20, 30, 40, 50, 70, 90, 110, 140, 170, 200, 240, 280, 320, 360, 400 or 440 up to 50, 100, 170, 270, 370, 470 or 512. In an example, when a given leaf node is a voxel, the value of N may lie in a range of 8 to 512. Herein, when the value of N is 8, each dimension of the voxel is 2 units, whereas when the value of N is 512, each dimension of the voxel is 8 units. In another example, when a given leaf node is an environment cube map, a value of N may be 1.

Optionally, the request message further comprises information indicative of a resolution required for the sample lighting data, wherein the at least one server is configured to create the sample lighting data at said resolution. The term "resolution" refers to a number of samples of the data pertaining to the lighting at the given location per unit area or volume of the given location. When the required resolution of the sample lighting data is high, the sample lighting data is created in a manner that the sample lighting data has a high detail of lighting information (i.e., a high lighting data density), and vice versa. Optionally, when creating the sample lighting data at the required resolution, the at least one server is configured to obtain, from the 3D lighting model, the data pertaining to the lighting in the given location at one or more hierarchical levels. In such a case, when the required resolution is high, the at least one server obtains a high density of samples of the data pertaining to the lighting at the given location from the 3D lighting model, and vice versa.

Optionally, the request message further comprises information indicative of a given direction from the given location, wherein the at least one server is configured to create the sample lighting data for the given direction from the given location. Optionally, the given location has different lighting in the real-world environment, when viewed from different directions. As an example, a real-world object arranged at the given location in the real-world environment may appear well lit from a first direction, but may appear to be in a shadow of another object, from a second direction. In such an example, sample lighting data for the first direction is indicative of bright lighting at the given location and is different from sample lighting data for the second direction, which is indicative of darkness at the given location. Therefore, when creating the sample lighting data, the at least one server takes into account the given direction from the given location, as the given direction provides a viewing perspective (i.e., how a real-world scene would appear in terms of lighting of the given location from the given direction.

Optionally, the request message further comprises information indicative of a target colour temperature, wherein the at least one server is configured to map the sample lighting data from an initial colour temperature to the target colour temperature. The term "colour temperature" is used to describe appearance (for example, colour) of lighting provided by a given light source. It will be appreciated that a given colour temperature (namely, a white point) is typically expressed in Kelvins. Optionally, the different regions in the real-world environment have different lighting, wherein each of the different lighting is associated with a specific colour temperature or a range of colour temperatures. In an example, when the lighting is a warm white lighting which is provided, for example, by a lamp, the colour temperature may be 2700 Kelvins. In another example, when the lighting is a day light lighting, the colour temperature may lie in a range of 5000 Kelvins to 6500 Kelvins. It will be appreciated that when a required lighting (for example, in the XR environment) at the given location is different from an existing lighting (in the real-world environment) of the given location, the client application sends the request message comprising the information indicative of the target colour temperature. In such a case, the initial colour temperature corresponds to the existing lighting, whereas the target colour temperature corresponds to the required lighting. In an example, the initial colour temperature may be 2700 Kelvins, whereas the target colour temperature may be 5500 Kelvins. Optionally, when mapping the sample lighting data from the initial colour temperature to the target colour temperature, the at least one server is configured to employ at least one colour temperature conversion algorithm. Optionally, when employing the at least colour temperature conversion algorithm, the at least one server is configured to: revert a colour correction matrix (CCM) and white balance gain(s) applied by an image signal processor of the at least one visible-light camera when capturing the at least one visible-light image, for obtaining an original image sensor colour space; and apply a required CCM and required white balance gain(s) corresponding to the target colour temperature on the original image sensor colour space. Optionally, the at least one server is configured to receive the required CCM and the required white balance gain(s) from a metadata associated with the image signal processor. Alternatively, optionally, the at least one server is configured to approximate the required CCM and the required white balance gain(s) by interpolating a subset of CCMs and white balance gains samples, based on the target colour temperature.

Optionally, the at least one server is configured to map the sample lighting data from an initial range of colour temperatures to a target range of colour temperatures. In this regard, the initial range of colour temperatures may include the initial colour temperature, while the target range of colour temperatures may include the target colour temperature. For example, the initial range of colour temperatures may lie from 2500 Kelvins to 3000 Kelvins, whereas the target range of colour temperatures may be 5200 Kelvins to 6000 Kelvins.

Notably, the sample lighting data is provided by the at least one server to the client application via the API. It will be appreciated that the client application is configured to employ the sample lighting data to accurately and photorealistically light the at least one virtual object at the given location in the XR environment, when generating the given XR image. The phrase "accurate and photorealistic lighting of the at least one virtual object" could mean at least one of: the at least one virtual object is illuminated by only light source(s) which is/are actually supposed to illuminate the at least one virtual object, the at least one virtual object is accurately illuminated from various directions, at accurate positions, and with an accurate intensity of lighting. Resultantly, the given XR image is optimally generated (i.e., realistically and accurately) in real-time (without any latency). Therefore, when the user of the display apparatus views the given XR image, the user experiences realism and immersiveness within the XR environment. It will also be appreciated that by utilizing the sample lighting data, it is possible to eliminate undesired effects of any moving real-world objects (such as people) on lighting, when only a static lighting is required in the XR environment. The sample lighting data can be employed to accurately reflect light off surface(s) of the at least one virtual object which may not even currently be in field(s) of view of the at least one visible-light camera and/or the at least one depth sensor. This reflected light would be accurately visible in the given XR image, thereby enhancing realism in the given XR image. White balance normalization and HDR textures are optionally applied to the sample lighting data prior to utilizing the sample lighting data, for accurate physically-based rendering (PBR).

Optionally, at least one of the plurality of visible-light images is captured using an exposure time that is lower than an exposure time used for capturing a remainder of the plurality of visible light images. When the exposure time used for capturing the at least one of the plurality of visible-light images is low, the at least one of the plurality of visible-light images is captured as at least one underexposed visible-light image. Beneficially, this enables in capturing a correct intensity for bright light sources present in the real-world environment. In an example, for every 10 visible-light images, 1 visible-light image may be captured using an exposure time that is lower an exposure time used for capturing remaining 9 visible light images. Similarly, optionally, at least one of the plurality of visible-light images is captured using an exposure time that is higher than an exposure time used for capturing a remainder of the plurality of visible light images. Beneficially, this enables in capturing a correct intensity for dark regions present in the real-world environment. It will be appreciated that the correct intensities for the bright light sources and/or the dark regions (captured using different exposure times) enables in reconstructing an HDR 3D lighting model of the real-world environment.

Optionally, the at least one server is configured to:
receive, from the client application, eye-tracking data of a user;
process the eye-tracking data to detect when the user's eyes blink or saccade; and
control the at least one visible-light camera to capture the at least one of the plurality of visible-light images during a time period in which the user's eyes blink or saccade.

Optionally, in this regard, the display apparatus comprises an eye-tracking means for detecting and/or following the user's eyes. The eye-tracking means could be implemented by way of at one camera monitoring blinking or saccades of the user's eyes, Infrared (IR)-based eye blinking sensors, and the like. Such eye-tracking means are well-known in the art. The eye-tracking data may comprise images of the user's eyes that are captured by the at least one camera, an eye-blink sensor data obtained from the IR-based eye blinking sensors, and the like. It will be appreciated that the eye-tracking data is received and processed repeatedly as the user's eyes blink or saccade several times whilst he/she uses the display apparatus. An up-to-date information of when the user's eyes blink or saccade allows for accurately capturing the at least one of the plurality of visible-light images during the time period in which the user's eyes blink or saccade. In such a time period, the user does not view the visual scene presented by the display apparatus, and therefore, would not notice discontinuities in the visual scene that are introduced on account of capturing the at least one of the plurality of visible-light images.

Optionally, the at least one server is configured to transform the plurality of visible-light images into a predefined colour temperature and luminance. The term "luminance" refers to a brightness (namely, an intensity) of a given visible-light image. It will be appreciated that the luminance of the given visible-light image may be typically expressed as candela per square metre. In some cases, the plurality of visible-light images may be captured at different colour temperatures and different luminance. In such cases, the 3D lighting model would be inaccurate and inconsistent as the different regions of the real-world environment would have different colour temperatures and different luminance. Therefore, the plurality of visible-light images are transformed into the predefined colour temperature and luminance in a manner that the plurality of visible-light images have consistent colour temperatures and luminance. Optionally, when transforming the plurality of visible-light images, the at least one server is configured to employ the at least one colour temperature conversion algorithm and at least one luminance conversion algorithm. Optionally, when employing the at least one colour temperature conversion algorithm, the at least one server is configured to apply a required CCM and required white balance gain(s) corresponding to the predefined colour temperature on the plurality of visible-light images. The predefined colour temperature is fixed, and would not change during operation. Optionally, when employing the at least one luminance conversion algorithm, the at least one server is configured to: normalize the plurality of visible-light images by dividing away effects of an exposure of the at least one visible-light camera; map luminance values of pixels in the plurality of visible-light images to physical luminance values, based on a luminance lookup table; and transform the luminance values to the physical luminance values. The exposure depends on an exposure time, a sensitivity, an aperture, and the like of the at least one visible-light camera. Imperfections of the at least one visible-light camera (such as vignetting effects), which could undesirably affect luminance transformation of the plurality of visible-light images, are optionally mitigated by tracking a behaviour of the at least one visible-light camera in terms of exposure, white balance, radiometric calibration, photometric calibration, colour calibration, image signal processing, and the like.

It will be appreciated that when such transformed visible-light images are employed for reconstructing the 3D lighting model, a consistent 3D lighting model is reconstructed. As an example, the predefined colour temperature and the luminance may be 6500 Kelvins and 180 candela per square metre, respectively.

Optionally, the at least one server is configured to:
update the three-dimensional lighting model of the real-world environment in real time, based on a plurality of new visible-light images and a plurality of new depth images captured by the at least one visible-light camera and the at least one depth sensor, respectively;
utilise the updated three-dimensional lighting model of the real-world environment to update the sample lighting data for the given location in the real-world environment; and
provide the client application with the updated sample lighting data.

It will be appreciated that optionally prior to updating the 3D lighting model, the at least one server is configured to control the at least one visible-light camera and the at least one depth sensor to capture the plurality of new visible-light images and the plurality of new depth images of a real-world environment, respectively. Optionally, the 3D lighting model is updated when the user is using the display apparatus in the real time. Such updation of the 3D light model may be performed when the user moves around the real-world environment (for example, the user changes his/her position in the real-world environment and/or when the pose of the display apparatus that is worn by the user on his/her head changes), when a change occurs in the real-world environment (for example, when new real-world objects are present in the real-world environment), and the like. It will be appreciated that the updation of the 3D lighting model, as well as of the sample lighting data, occurs in real time or near-real time (without any latency). Moreover, said updation requires minimal computational resources of the at least one server, and also requires minimal bandwidth for providing the updated sample lighting data to the client application. Beneficially, the client application is optionally configured to employ the updated sample lighting data to accurately and photorealistically light the at least one virtual object when generating the given XR image, in the real time. Therefore, when the user of the display apparatus views the given XR image, the user experiences realism and immersiveness within the XR environment.

The present disclosure also relates to the method as described above. Various embodiments and variants disclosed above apply mutatis mutandis to the method.

Optionally, in the method, the three-dimensional lighting model is in a form of a three-dimensional grid, and wherein the sample lighting data comprises given data stored in N nearest leaf nodes in the three-dimensional grid that are weighted based on their distances from the given location in the real-world environment.

Optionally, in the method, the three-dimensional lighting model is in a form of at least one of: a three-dimensional grid, a three-dimensional hierarchical grid, a bounding volume hierarchy, a three-dimensional polygonal mesh.

Optionally, in the method, the data pertaining to the lighting in the different regions comprises at least one of: 360-degree environment cube maps, coefficients of a spherical harmonics representation, pixel values, bitmaps, panorama formats.

Optionally, in the method, the request message further comprises information indicative of a resolution required for the sample lighting data, wherein the sample lighting data is created at said resolution.

Optionally, in the method, the request message further comprises information indicative of a given direction from the given location, wherein the sample lighting data is created for the given direction from the given location.

Optionally, in the method, the request message further comprises information indicative of a target colour temperature, wherein the method further comprises mapping the sample lighting data from an initial colour temperature to the target colour temperature.

Optionally, the method further comprises:
updating the three-dimensional lighting model of the real-world environment in real time, based on a plurality of new visible-light images and a plurality of new depth images captured by the at least one visible-light camera and the at least one depth sensor, respectively;
utilising the updated three-dimensional lighting model of the real-world environment to update the sample lighting data for the given location in the real-world environment; and
providing the client application with the updated sample lighting data.

Optionally, in the method, at least one of the plurality of visible-light images is captured using an exposure time that is lower than an exposure time used for capturing a remainder of the plurality of visible light images.

Optionally, the method further comprises transforming the plurality of visible-light images into a predefined colour temperature and luminance.

DETAILED DESCRIPTION OF THE DRAWINGS

Figure 1:
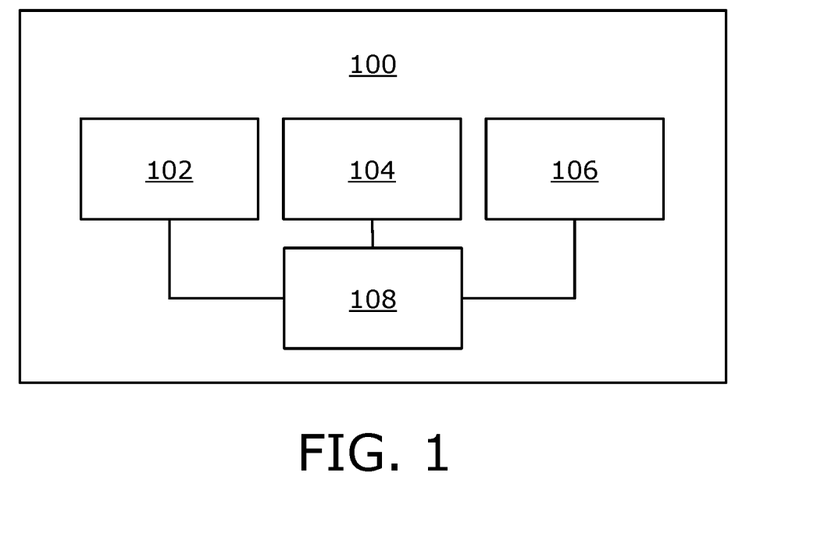
FIG. 1 illustrates a block diagram of architecture of an imaging system, in accordance with an embodiment of the present disclosure.

Referring to FIG. 1, a block diagram of architecture of an imaging system 100, in accordance with an embodiment of the present disclosure. The imaging system 100 comprises at least one visible-light camera (depicted as a visible-light camera 102), at least one depth sensor (depicted as a depth sensor 104), pose-tracking means 106, and at least one server (depicted as a server 108). The server 108 is coupled to the visible-light camera 102, the depth sensor 104, and the pose-tracking means 106.

It may be understood by a person skilled in the art that the FIG. 1 includes simplified architecture of the imaging systems 100 for sake of clarity, which should not unduly limit the scope of the claims herein. The person skilled in the art will recognize many variations, alternatives, and modifications of embodiments of the present disclosure.

Figure 2:
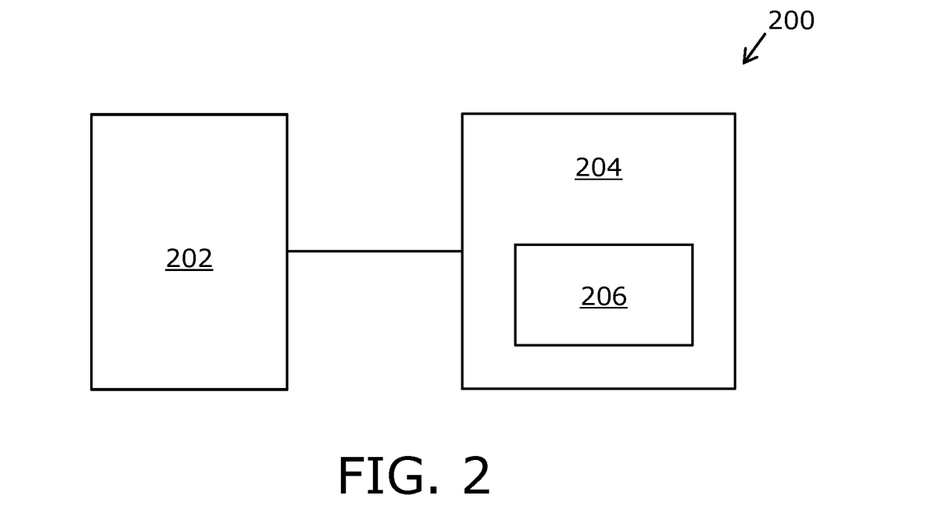
FIG. 2 illustrates a system where an imaging system is used, in accordance with an embodiment of the present disclosure.

Referring to FIG. 2, illustrated is a system 200 where an imaging system 202 is used, in accordance with an embodiment of the present disclosure. The system 200 includes the imaging system 202 communicably coupled with a display apparatus 204. A client application 206 executes on the display apparatus 204. Notably, at least one server (not shown) of the imaging system 202 is communicably coupled with the client application 206.

Figure 3:
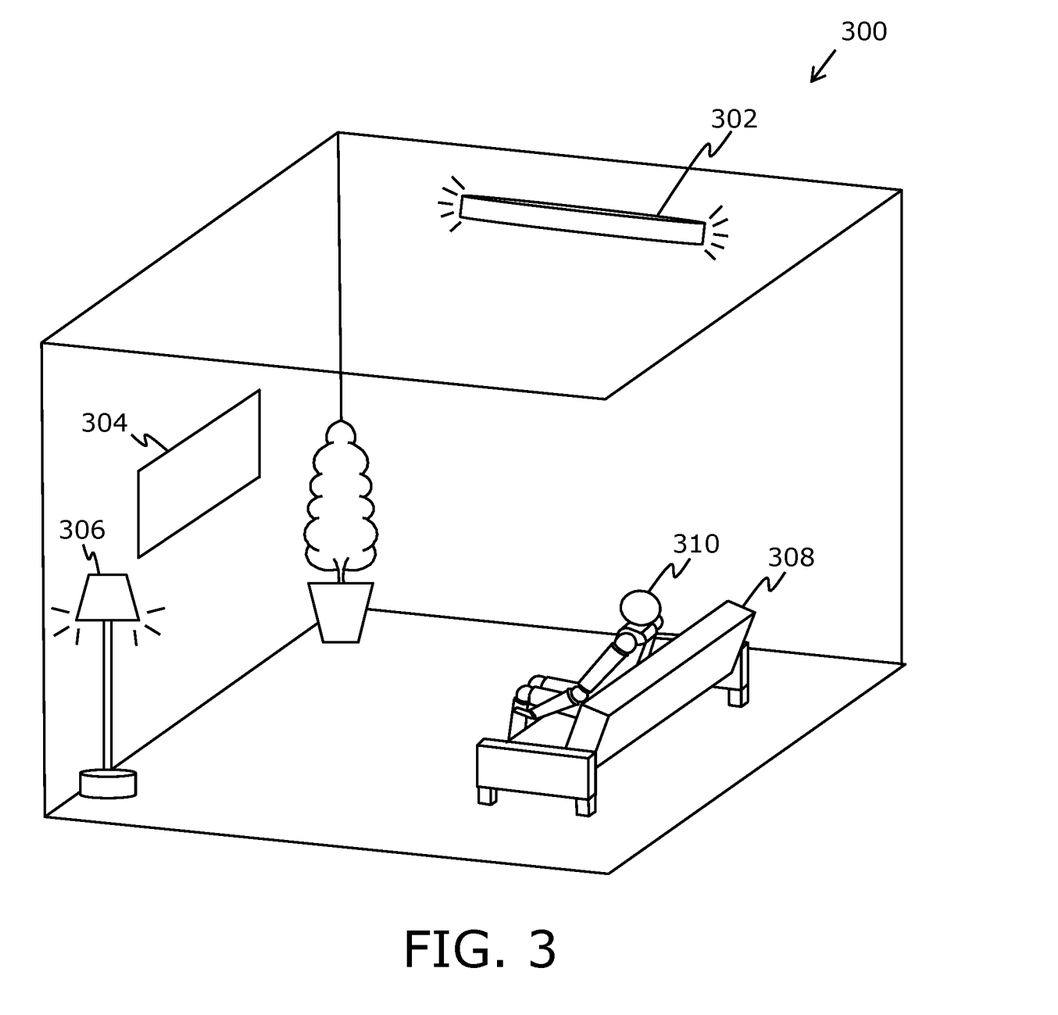
FIG. 3 illustrates an exemplary real-world environment, in accordance with an embodiment of the present disclosure.

Referring to FIG. 3, illustrated is an exemplary real-world environment 300, in accordance with an embodiment of the present disclosure. The real-world environment 300 has three light sources 302, 304, and 306 arranged therein. The light source 302 is a tube light, the light source 304 is a display of a television, and the light source 306 is a lamp. A three-dimensional (3D) lighting model of the real-world environment 300 is representative of lighting in different regions of the real-world environment 300 and stores data pertaining to the lighting in the different regions. As shown, the lighting in the different regions of the real-world environment 300 can be different. For example, lighting in a region surrounding the light source 302 is different from lighting in a region behind a couch 308 (on which a person 310 is sitting). A sample lighting data for a given location in the real-world environment 300 is created using the 3D lighting model, wherein the sample lighting data is representative of the lighting at the given location in the real-world environment 300. This sample lighting data is eventually utilized by a client application to photorealistically light at least one virtual object (not shown) in an extended-reality (XR) environment.

It may be understood by a person skilled in the art that the FIGS. 2 and 3 are merely examples for sake of clarity, which should not unduly limit the scope of the claims herein. The person skilled in the art will recognize many variations, alternatives, and modifications of embodiments of the present disclosure.

Figure 4:
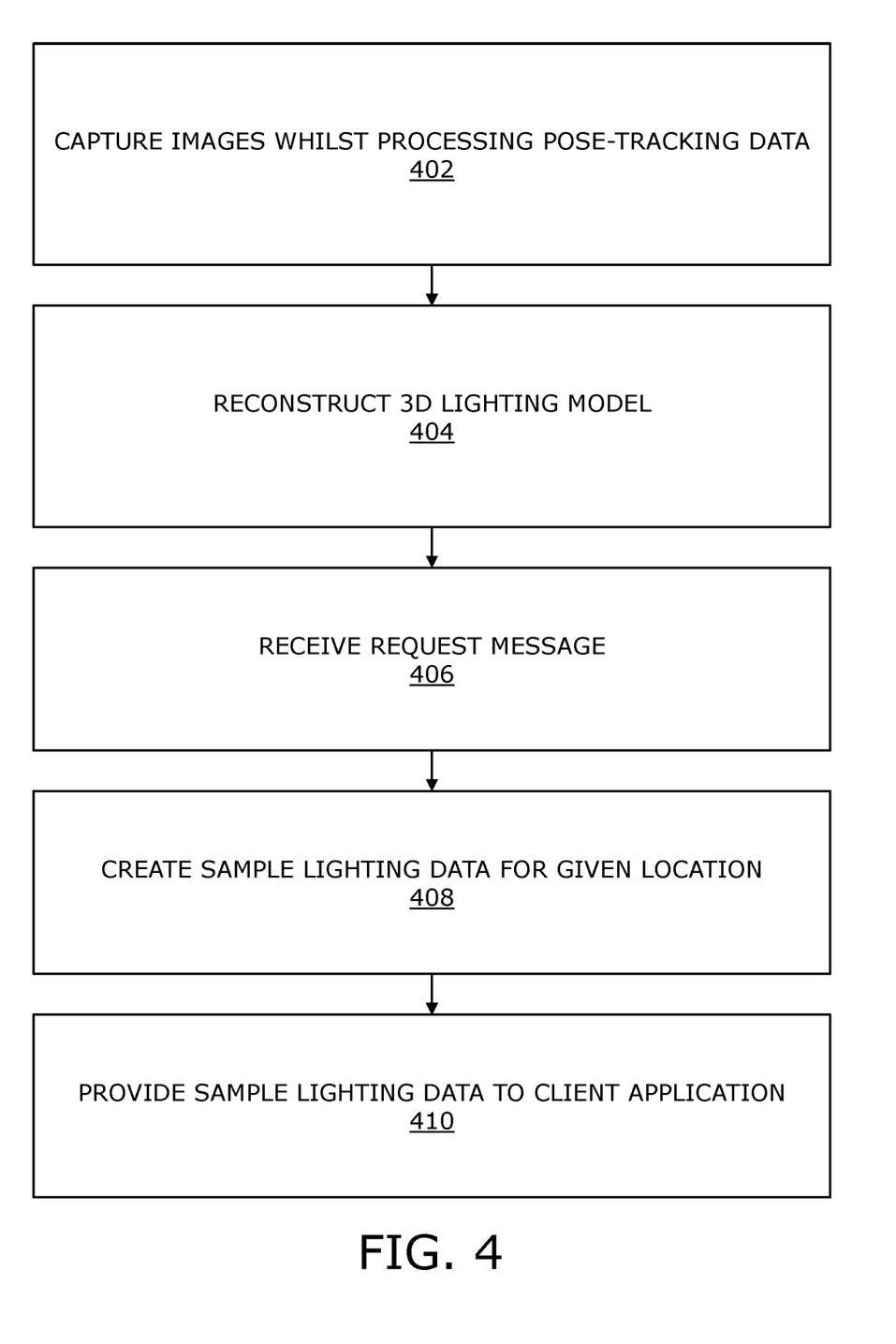
FIG. 4 illustrates steps of a method, in accordance with an embodiment of the present disclosure.

Referring to FIG. 4, illustrated are steps of a method, in accordance with an embodiment of the present disclosure. At step 402, at least one visible-light camera and at least one depth sensor are controlled to capture a plurality of visible-light images and a plurality of depth images of a real-world environment, respectively, whilst pose-tracking data obtained from pose-tracking means is processed to determine corresponding poses of the at least one visible-light camera and the at least one depth sensor with respect to which the plurality of visible-light images and the plurality of depth images are captured, respectively. At step 404, a three-dimensional lighting model of the real-world environment is reconstructed, based on the plurality of visible-light images, the plurality of depth images and the corresponding poses of the at least one visible-light camera and the at least one depth sensor. The three-dimensional lighting model is representative of lighting in different regions of the real-world environment and stores data pertaining to the lighting in the different regions. At step 406, there is received, from a client application, a request message comprising information indicative of a given location in the real-world environment where at least one virtual object is to be placed. At step 408, the three-dimensional lighting model of the real-world environment is utilised to create sample lighting data for the given location in the real-world environment, wherein the sample lighting data is representative of the lighting at the given location in the real-world environment. At step 410, the client application is provided with the sample lighting data.

The steps 402, 404, 406, 408, and 410 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present.

Reference to the singular is also to be construed to relate to the plural.

What is claimed is:

1. An imaging system comprising:
   at least one visible-light camera;
   at least one depth sensor;
   pose-tracking means; and
   at least one server configured to:
   control the at least one visible-light camera and the at least one depth sensor to capture a plurality of visible-light images and a plurality of depth images of a real-world environment, respectively, whilst processing pose-tracking data obtained from the pose-tracking means to determine corresponding poses of the at least one visible-light camera and the at least one depth sensor with respect to which the plurality of visible-light images and the plurality of depth images are captured, respectively;
   reconstruct a three-dimensional lighting model of the real-world environment, based on the plurality of visible-light images, the plurality of depth images and the corresponding poses of the at least one visible-light camera and the at least one depth sensor, wherein the three-dimensional lighting model is representative of lighting in different regions of the real-world environment and stores data pertaining to the lighting in the different regions;
   receive, from a client application, a request message comprising information indicative of a given location in the real-world environment where at least one virtual object is to be placed;
   utilise the three-dimensional lighting model of the real-world environment to create sample lighting data for the given location in the real-world environment, wherein the sample lighting data is representative of the lighting at the given location in the real-world environment; and
   provide the client application with the sample lighting data.

2. The imaging system of claim 1, wherein the three-dimensional lighting model is in a form of a three-dimensional grid, and wherein the sample lighting data comprises given data stored in N nearest leaf nodes in the three-dimensional grid that are weighted based on their distances from the given location in the real-world environment.

3. The imaging system of claim 1, wherein the three-dimensional lighting model is in a form of at least one of: a three-dimensional grid, a three-dimensional hierarchical grid, a bounding volume hierarchy, a three-dimensional polygonal mesh.

4. The imaging system of claim 1, wherein the data pertaining to the lighting in the different regions comprises at least one of: 360-degree environment cube maps, coefficients of a spherical harmonics representation, pixel values, bitmaps, panorama formats.

5. The imaging system of claim 1, wherein the request message further comprises information indicative of a resolution required for the sample lighting data, wherein the at least one server is configured to create the sample lighting data at said resolution.

6. The imaging system of claim 1, wherein the request message further comprises information indicative of a given direction from the given location, wherein the at least one server is configured to create the sample lighting data for the given direction from the given location.

7. The imaging system of claim 1, wherein the request message further comprises information indicative of a target colour temperature, wherein the at least one server is configured to map the sample lighting data from an initial colour temperature to the target colour temperature.

8. The imaging system of claim 1, wherein the at least one server is configured to:
update the three-dimensional lighting model of the real-world environment in real time, based on a plurality of new visible-light images and a plurality of new depth images captured by the at least one visible-light camera and the at least one depth sensor, respectively;
utilise the updated three-dimensional lighting model of the real-world environment to update the sample lighting data for the given location in the real-world environment; and
provide the client application with the updated sample lighting data.

9. The imaging system of claim 1, wherein at least one of the plurality of visible-light images is captured using an exposure time that is lower than an exposure time used for capturing a remainder of the plurality of visible light images.

10. The imaging system of claim 1, wherein the at least one server is configured to transform the plurality of visible-light images into a predefined colour temperature and luminance.

11. A method comprising:
controlling at least one visible-light camera and at least one depth sensor to capture a plurality of visible-light images and a plurality of depth images of a real-world environment, respectively, whilst processing pose-tracking data obtained from pose-tracking means to determine corresponding poses of the at least one visible-light camera and the at least one depth sensor with respect to which the plurality of visible-light images and the plurality of depth images are captured, respectively;
reconstructing a three-dimensional lighting model of the real-world environment, based on the plurality of visible-light images, the plurality of depth images and the corresponding poses of the at least one visible-light camera and the at least one depth sensor, wherein the three-dimensional lighting model is representative of lighting in different regions of the real-world environment and stores data pertaining to the lighting in the different regions;
receiving, from a client application, a request message comprising information indicative of a given location in the real-world environment where at least one virtual object is to be placed;
utilising the three-dimensional lighting model of the real-world environment to create sample lighting data for the given location in the real-world environment, wherein the sample lighting data is representative of the lighting at the given location in the real-world environment; and
providing the client application with the sample lighting data.

12. The method of claim 11, wherein the three-dimensional lighting model is in a form of a three-dimensional grid, and wherein the sample lighting data comprises given data stored in N nearest leaf nodes in the three-dimensional grid that are weighted based on their distances from the given location in the real-world environment.

13. The method of claim 11, wherein the three-dimensional lighting model is in a form of at least one of: a three-dimensional grid, a three-dimensional hierarchical grid, a bounding volume hierarchy, a three-dimensional polygonal mesh.

14. The method of claim 11, wherein the data pertaining to the lighting in the different regions comprises at least one of: 360-degree environment cube maps, coefficients of a spherical harmonics representation, pixel values, bitmaps, panorama formats.

15. The method of claim 11, wherein the request message further comprises information indicative of a resolution required for the sample lighting data, wherein the sample lighting data is created at said resolution.

16. The method of claim 11, wherein the request message further comprises information indicative of a given direction from the given location, wherein the sample lighting data is created for the given direction from the given location.

17. The method of claim 11, wherein the request message further comprises information indicative of a target colour temperature, wherein the method further comprises mapping the sample lighting data from an initial colour temperature to the target colour temperature.

18. The method of claim 11, further comprising:
updating the three-dimensional lighting model of the real-world environment in real time, based on a plurality of new visible-light images and a plurality of new depth images captured by the at least one visible-light camera and the at least one depth sensor, respectively;
utilising the updated three-dimensional lighting model of the real-world environment to update the sample lighting data for the given location in the real-world environment; and
providing the client application with the updated sample lighting data.

19. The method of claim 11, wherein at least one of the plurality of visible-light images is captured using an exposure time that is lower than an exposure time used for capturing a remainder of the plurality of visible light images.

20. The method of claim 11, further comprising transforming the plurality of visible-light images into a predefined colour temperature and luminance.

* * * * *